(12) United States Patent
Farrell (10) Patent No.: US 10,360,302 B2
(45) Date of Patent: Jul. 23, 2019

(54) VISUAL COMPARISON OF DOCUMENTS USING LATENT SEMANTIC DIFFERENCES

(71) Applicant: INTERNATIONAL BUSINESS MACHINES CORPORATION, Armonk, NY (US)

(72) Inventor: Robert G. Farrell, Cornwall, NY (US)

(73) Assignee: International Business Machines Corporation, Armonk, NY (US)

(*) Notice: Subject to any disclaimer, the term of this patent is extended or adjusted under 35 U.S.C. 154(b) by 29 days.

(21) Appl. No.: 15/706,580

(22) Filed: Sep. 15, 2017

(65) Prior Publication Data
US 2019/0087409 A1 Mar. 21, 2019

(51) Int. Cl.
*G06F 16/33* (2019.01)
*G06F 16/93* (2019.01)
*G06F 17/27* (2006.01)
*G06F 16/332* (2019.01)
*G06F 16/338* (2019.01)

(52) U.S. Cl.
CPC ........ *G06F 17/2785* (2013.01); *G06F 16/338* (2019.01); *G06F 16/3323* (2019.01); *G06F 16/3344* (2019.01); *G06F 16/93* (2019.01)

(58) Field of Classification Search
CPC ............... G06F 17/27; G06F 17/2785; G06F 17/30616; G06F 17/30705; G06F 16/93; G06F 16/3323
USPC .................................. 704/1, 9; 707/737, 739
See application file for complete search history.

(56) References Cited

U.S. PATENT DOCUMENTS

| | | | |
|---|---|---|---|
| 6,728,695 B1* | 4/2004 | Pathria | G06F 17/2715 |
| 9,195,640 B1 | 11/2015 | Donneau-Golencer et al. | |
| 9,740,368 B1* | 8/2017 | Love | G06F 3/04817 |
| 9,842,105 B2* | 12/2017 | Bellegarda | G06F 17/2785 |
| 9,911,211 B1* | 3/2018 | Damaraju | G06T 11/206 |

(Continued)

OTHER PUBLICATIONS

Dou, Wenwen, et al. "Paralleltopics: A probabilistic approach to exploring document collections." Visual Analytics Science and Technology (VAST), 2011 IEEE Conference on. IEEE, Oct. 2011, pp. 231-240 (Year: 2011).*

(Continued)

*Primary Examiner* — James S Wozniak
(74) *Attorney, Agent, or Firm* — Nicole A. Spence (57) ABSTRACT

A method, computer system, and a computer program product for comparing documents using latent semantic differences is provided. The present invention may include receiving documents from a user. The present invention may also include extracting linguistic units associated with the received documents. The present invention may then include building latent semantic dimensions based on the extracted linguistic units. The present invention may then include weighting the extracted linguistic units utilizing the built latent semantic dimensions. The present invention may then include determining latent semantic differences between the received documents based on weighted linguistic units. The present invention may also include mapping the weighted linguistic units to a scaled visual feature. The present invention may further include generating a visualization to the user of the received documents based on the determined latent semantic differences and the scaled visual feature.

17 Claims, 5 Drawing Sheets

(56) References Cited

U.S. PATENT DOCUMENTS

| | | | | |
|---|---|---|---|---|
| 2003/0122874 | A1* | 7/2003 | Dieberger | G06F 3/0485 715/764 |
| 2003/0225749 | A1* | 12/2003 | Cox | G06F 17/30705 |
| 2004/0205629 | A1* | 10/2004 | Rosenholtz | G06F 17/30861 715/207 |
| 2006/0242190 | A1* | 10/2006 | Wnek | G06F 17/3071 |
| 2007/0022072 | A1* | 1/2007 | Kao | G06F 17/2211 706/45 |
| 2007/0073748 | A1* | 3/2007 | Barney | G06F 17/30675 |
| 2009/0190839 | A1 | 7/2009 | Higgins | |
| 2010/0332511 | A1* | 12/2010 | Stockton | G06F 17/30616 707/759 |
| 2011/0029491 | A1* | 2/2011 | Joshi | G06F 17/30675 707/692 |
| 2011/0060983 | A1* | 3/2011 | Cai | G06F 16/9562 715/254 |
| 2011/0225159 | A1* | 9/2011 | Murray | G06F 17/30713 707/739 |
| 2012/0078612 | A1* | 3/2012 | Kandekar | G06F 17/2745 704/9 |
| 2012/0233127 | A1* | 9/2012 | Solmer | G06F 17/30073 707/661 |
| 2012/0281011 | A1* | 11/2012 | Reichenstein | G06F 17/211 345/596 |
| 2014/0129212 | A1 | 5/2014 | Danielyan et al. | |
| 2014/0229163 | A1* | 8/2014 | Gliozzo | G06F 17/2785 704/9 |
| 2014/0281479 | A1* | 9/2014 | Gettings | G01N 33/0062 713/150 |
| 2014/0297269 | A1* | 10/2014 | Qian | G06F 17/2785 704/9 |
| 2015/0278200 | A1* | 10/2015 | He | G06F 17/2785 704/2 |
| 2015/0324342 | A1* | 11/2015 | Chin | G06F 17/30029 715/231 |
| 2016/0217343 | A1* | 7/2016 | Hoffman | G06K 9/6215 |
| 2016/0283467 | A1* | 9/2016 | Dascalu | G06F 17/30106 |
| 2017/0032035 | A1* | 2/2017 | Gao | G06N 3/08 |
| 2017/0351668 | A1* | 12/2017 | Milan | G06F 17/30011 |
| 2018/0173699 | A1* | 6/2018 | Tacchi | G06F 17/2785 |

OTHER PUBLICATIONS

Landauer, et al. "From paragraph to graph: Latent semantic analysis for information visualization." Proceedings of the National Academy of Sciences 101.suppl 1, Apr. 2004, pp. 5214-5219. (Year: 2004).*

Wei, Chao, et al. "Locally Embedding autoencoders: a semi-supervised manifold learning approach of document representation." PloS one 11.1, Jan. 2016, pp. 1-20. (Year: 2016).*

Yanagimoto, et al. "Document similarity estimation for sentiment analysis using neural network." Computer and Information Science (ICIS), 2013 IEEE/ACIS 12th International Conference on. IEEE, Jun. 2013, pp. 105-110. (Year: 2013).*

Yu, Bo, et al. "Latent semantic analysis for text categorization using neural network." Knowledge-Based Systems 21.8, Dec. 2008, pp. 900-904. (Year: 2008).*

Etemadpour et al., "Choosing Visualization Techniques for Multi-dimensional Data Projection Tasks: A Guideline with Examples," Computer Vision, Imaging and Computer Graphics Theory and Applications, 2016, p. 1-21, Springer International Publishing.

Heuer, "Text Comparison Using Word Vector Representations and Dimensionality Reduction," Proceedings of the 8th European Conference on Python in Science (EuroSciPy 2015), Aug. 2015, p. 13-16.

Mell et al., "The NIST Definition of Cloud Computing," National Institute of Standards and Technology, Sep. 2011, p. 1-3, Special Publication 800-145.

Oleshchuk et al., "Ontology Based Semantic Similarity Comparison of Documents," Proceedings of the 14th International Workshop on Database and Expert Systems Applications (DEXA'03), Sep. 1-5, 2003, 4 Pages, IEEE computer Society.

Steinbach et al., "A Comparison of Document Clustering Techniques," KDD-2000 Workshop on Text Mining, Sixth ACM SIGKDD International Conference on Knowledge Discovery and Data Mining, Aug. 20-23, 2000, p. 1-2, Boston, MA, USA.

Jan Der Maaten, "t-SNE," Laurens van der Maaten Website on t-SNE, p. 1-5, https://lvdmaaten.github.io/tsne/, Accessed on Jun. 29, 2017.

* cited by examiner

VISUAL COMPARISON OF DOCUMENTS USING LATENT SEMANTIC DIFFERENCES

BACKGROUND

The present invention relates generally to the field of computing, and more particularly to computational linguistics.

Many domains, for example law, oil exploration or equipment troubleshooting, involve comparing documents for making informed decisions. Complex documents with natural language text are difficult to compare, such as two regulations, two assessment reports or two equipment failure reports. These documents may involve different ways of expressing underlying ideas, the ideas may be spread out in the documents, and the similarities and differences may have to be evaluated in the context of the other text.

SUMMARY

Embodiments of the present invention disclose a method, computer system, and a computer program product for comparing documents using latent semantic differences. The present invention may include receiving a plurality of documents from a user. The present invention may also include extracting a plurality of linguistic units associated with the received plurality of documents. The present invention may then include building a plurality of latent semantic dimensions based on the extracted plurality of linguistic units. The present invention may then include weighting the extracted plurality of linguistic units utilizing the built plurality of latent semantic dimensions. The present invention may then include determining a plurality of latent semantic differences between the received plurality of documents based on weighted plurality of linguistic units. The present invention may also include mapping the weighted plurality of linguistic units to a scaled visual feature. The present invention may further include generating a visualization to the user of the received plurality of documents based on the determined plurality of latent semantic differences and the scaled visual feature.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for comparing at least two documents using latent semantic differences. As such, the present embodiment has the capacity to improve the technical field of computational linguistics by comparing documents utilizing latent semantic differences. More specifically, the visual-based document comparison program may receive at least two documents and the visual-based document comparison program may extract linguistic units from the received documents. The visual-based document comparison program may build latent semantic dimensions from the extracted linguistic units and then may map the latent semantic dimensions to the weighted linguistic units. The weighted linguistic units may then be mapped to a scaled visual feature to visualize the received documents. The visual-based document comparison program may then present the latent semantic differences between the visualized documents.

As previously described, many domains, for example law, oil exploration or equipment troubleshooting, involve comparing documents for making informed decisions. Complex documents with natural language text are difficult to compare, such as two regulations, two assessment reports or two equipment failure reports. These documents may involve different ways of expressing underlying ideas, the ideas may be spread out in the documents, and the similarities and differences may have to be evaluated in the context of the other text.

Principal Components Analysis (PCA), Latent Semantic Analysis (LSA), Latent Dircholet Allocation (LDA), and other count-based methods may be utilized to compute a reduced dimensional vector space by counting how often words co-occur with their neighbors. Predictive models (e.g., Word2Vec) may try to predict words based on co-occurrences in terms of small, dense embedding vectors with neural networks. These embedding vectors may be projected onto a reduced dimensional vector space using t-distributed stochastic neighbor embedding (t-SNE) or other techniques. A method may be utilized to generate statistical latent semantic dimensions using these techniques with a document corpus and compare documents as points in multi-dimensional scatterplot. However, such a method may not provide a useful way of comparing two documents in context while viewing the natural language text. Additionally, there are methods to generate differences in words or phrases in two documents. One method is to utilize an abstraction hierarchy. However, these methods fail to utilize latent semantics and are dependent on the underlying ideas in the document being expressed using the same terms, or manual work must be done to align the terms with an ontology.

Therefore, it may be advantageous to, among other things, to generate a visualization of the latent semantics of a document and contrast that latent semantics with that of another document.

According to at least one embodiment, through the combination of viewing the natural language text, the primary idea in the document may be observed with shaded colors that correspond with the reduced dimensions that the neural network or vector space method found. In the present embodiment, the differences between the documents may be clarified by subtracting the underlying dimensions and then visualization using the same method.

According to at least one embodiment, the visual-based document comparison program may utilize reverse mapping of dimensions to weighted linguistic units. The text may be visualized in terms of dimensions and the user may browse dimensions of similarity or difference.

According to at least one embodiment, the visual-based document comparison program may utilize a dimensionality reduction to reduce the high dimension "unit x document" matrix to a lower dimension (rank) matrix. As a consequence of the dimension reduction, some dimensions may depend on more than one linguistic unit.

According to at least one embodiment, the visual-based document comparison program may assign a hue to each dimension. Since the background and text of received documents may be various colors, the visual-based document comparison program may utilize colors determined by the user. The user may utilize an adjustable user interface slider to modify the color (saturation, lightness and hue) of a dimension. In the present embodiment, the darkening or shading (the opposite of lightness) may be utilized to indicate the weight of the linguistic units. The visual-based document comparison program may utilize four levels of shading, and the greater the level of shade, the greater the weight of the linguistic unit.

According to at least one embodiment, the visual-based document comparison program may implement variations in the algorithms utilized to compare the documents and to visualize the documents using latent semantic differences. If the latent semantic space has not been recalculated, then new documents may be incrementally added and mapped to the same reduced vector space. The visual-based document comparison program may re-compute the semantic space each time a new batch of documents arrives. The new batch of documents may, for example, include a zip file with a large quantity of documents, or a new single document.

The present embodiment may be integrated into a previously existing software application in which the visual-based document comparison program may serve as a pre-processor. An editor software application may add or remove the mark-up within the document that is generated by the visual-based document comparison program. The editor software application may be configured to enable the users to provide feedback and provide corrections. However, if the latent semantic space is recomputed, the generated mark-up may be different and various schemes may be included for combining user-generated, or system-generated mark-up (e.g., never overwrite user mark-up, but regenerate mark-up for other text). According to at least one other embodiment, the visual-based document comparison program may be a separate program, not integrated into another program, for document comparison.

Figure 1:
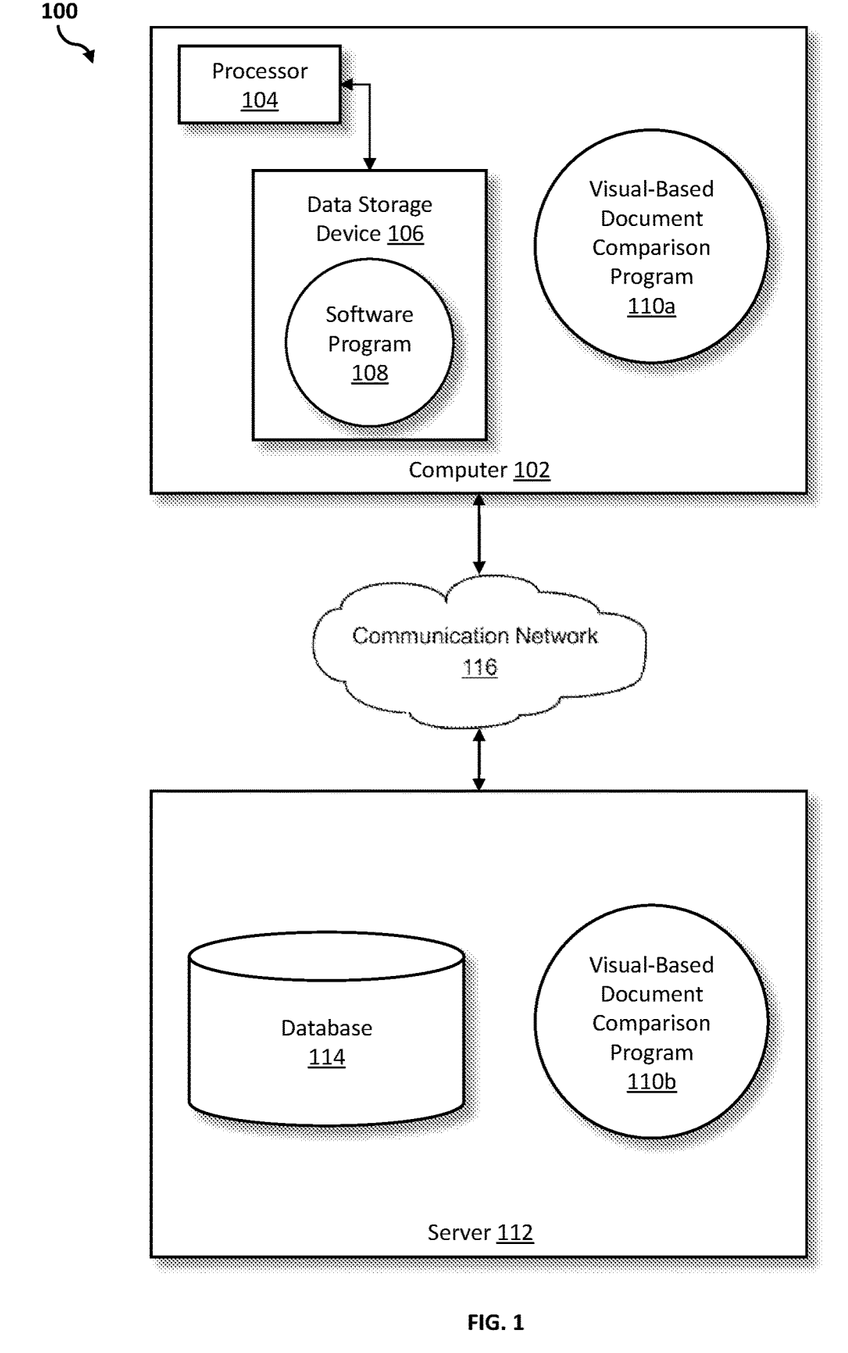
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visual-based document comparison program 110*a*. The networked computer environment 100 may also include a server 112 that is enabled to run a visual-based document comparison program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the visual-based document comparison program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the visual-based document comparison program 110*a*, 110*b* (respectively) to compare documents using latent semantic differences. The visual-based document comparison method is explained in more detail below with respect to FIG. 2.

Figure 2:
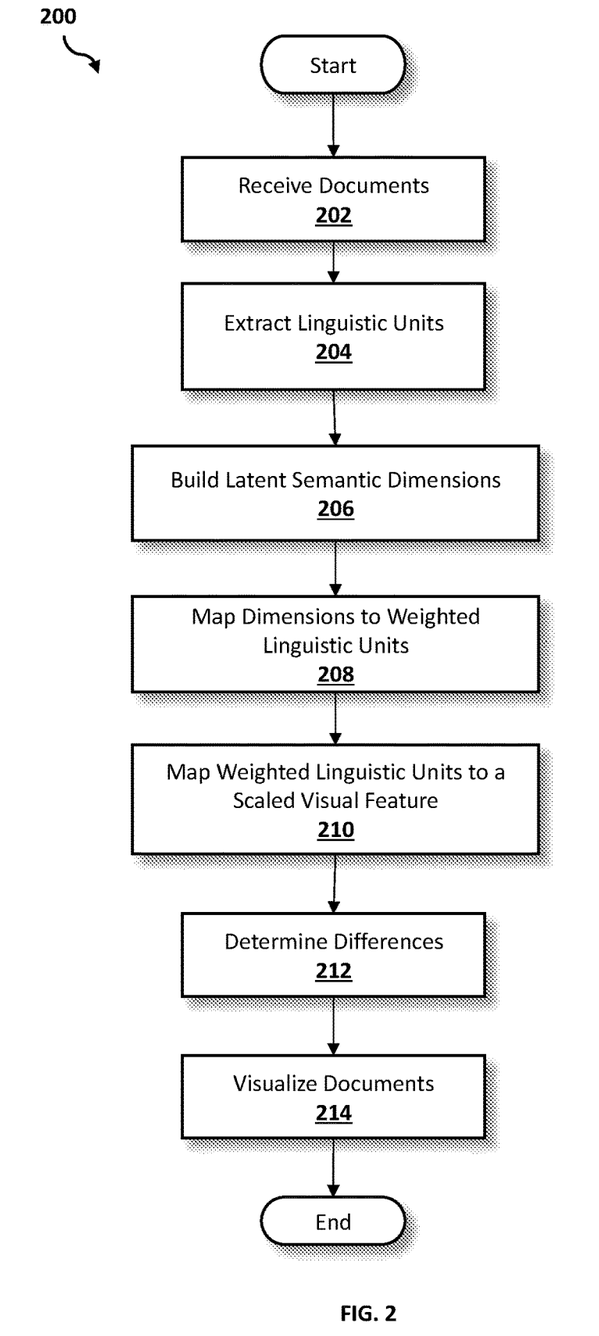
FIG. 2 is an operational flowchart illustrating a process for visual-based document comparison according to at least one embodiment.

Referring now to FIG. 2, an operational flowchart illustrating the exemplary visual-based document comparison process 200 used by the visual-based document comparison program 110*a* and 110*b* according to at least one embodiment is depicted.

At 202, at least two documents are received. Using a software program 108 on the user's device (e.g., user's computer 102), at least two documents (e.g., scientific publications, articles, regulations, reports, emails, and other forms of writings) may be received as input in a database 114. A cloud service may be utilized by a user in which documents (e.g., in a zip file) may be converted for processing and stored on the database 114 within the server 112. The full set of documents on server 112 may be used, or at least two received documents may be utilized to build the latent semantic dimensions. The visual-based document comparison program 110*a*, 110*b* may be configured to periodically build the latent semantic dimensions. After building the latent semantic dimensions, the user may browse through the processed documents and select two documents for the visual-based document comparison process 200. Alternatively, the user may build the latent semantic dimensions (e.g., when a regulation frequently changes) by manually inputting at least two documents directly into the visual-based document comparison program 110a, 110b.

The number and size of the documents uploaded into or selected for the visual-based document comparison program 110a, 110b may be limited by the available storage on server 112. Since a very large quantity of documents may be difficult for the user to browse through, the visual-based document comparison program 110a, 110b may include a search feature to improve the capabilities of the user to find the two documents from the set of uploaded documents to compare. A "Search Feature" button, for example, may be located at the bottom of the screen, and the user may click the "Search Feature" button to reduce the number of documents to consider when a large quantity of documents are stored in the database 114 and available for the user to browse and select for comparison using the visual-based document comparison program 110a, 110b. The search feature may match or filter input key words, phrases, or metadata through the entire collections of documents in the cloud storage, or the recently uploaded documents, and may determine a set of documents to present to the user. Metadata may include time, date, author, location, category, document size, and other data about the documents. Then user may then determine whether to compare the documents. As such, visual-based document comparison program 110a, 110b may compare a subset of the received documents.

For example, the user is researching the recent changes in the New York City building codes related to the construction permits for multiple family dwellings. Therefore, the user searches the user's cloud storage (e.g., database 114) for these regulations on the server 112. Upon finding these regulations, the user uploads these regulations to the visual-based document comparison program 110a, 110b. The user then browses the regulations and selects the regulations associated with the construction permits for multiple family dwellings. Document 1 includes of the following text: "A construction permit for a multi-family dwelling." Document 2 includes of the following text: "A licensed contractor was given a construction permit for multiple-family dwellings. It was a new licensed contractor."

In another embodiment, the visual-based document comparison program 110a, 110b may utilize a Representational State Transfer (REST) web service (i.e., an architecture style that specifies constraints that if applied to a web service may induce desirable properties that enable services to work best on the Web) in the cloud that receives the zip file or individual documents, and uploads the documents using a multi-part POST request (i.e., web server accepts the data enclosed in the body of the request message, most likely for storing the data). The documents may then be stored on the file system of the server 112. In the present embodiment, the documents may be received on the server 112, and the cloud storage may store the received documents.

In another embodiment, each of the received documents may include an identifier to determine if a received document is identical to a previous document. The identification of the received documents may prohibit duplication of the documents. Additionally, if the received document is an updated revision of the previous document, then the visual-based document comparison program 110a, 110b may replace the previous document with the received document.

In another embodiment, the user may visit a web page associated with the visual-based document comparison program 110a, 110b. On the web page, the visual-based document comparison program 110a, 110b may show the documents for comparison, with a warning, error, or information box, and a form to enter values of parameters. The documents for comparison may, for example, include the first document received, and the second document may be included in a collection of documents on the cloud storage, or at least the two documents received by the user.

In another embodiment, if the visual-based document comparison program 110a, 110b receives one document as input, then the visual-based document comparison program 110a, 110b may display or print an error message indicating that at least two documents may be entered into the visual-based document comparison program 110a, 110b. For example, on the user interface or web page, the visual-based document comparison program 110a, 110b may print or display, "0 documents available" or "Only 1 document available." At least two documents may be received by the visual-based document comparison program 110a, 110b for the commencement of the visual-based document comparison process 200.

In another embodiment, the visual-based document comparison program 110a, 110b may utilize documents in other formats (e.g., portable document format or hypertext markup language). For documents in other formats, the visual-based document comparison program 110a, 110b may utilize known external software applications to convert the document to a format that can be processed by the visual-based document comparison program 110a, 110b.

Next, at 204, the linguistic units are extracted from each of the received documents. The visual-based document comparison program 110a, 110b may extract linguistic units (e.g., content words and phrases) from each of the received documents by utilizing a known tokenizer. The tokenizer, which may utilize a known natural language processing technique, may run over each document to extract tokens (i.e., strings that are delimited by white spaces such as space, carriage return and line feed (CR/LF) and separators, and punctuation such as periods, commas, question marks or exclamation marks). Then, a known part-of-speech tagger may be utilized to assign parts of speech to word tokens. A known text chunker may then be utilized to extract non-overlapping word token sequences (phrases) as noun phrase (NP) linguistic units. Unique linguistic units (i.e., canonical linguistic units) are retained and mentions of these linguistic units in documents, with variants, are tracked in a set of tables. A dictionary may be available with known variants of canonical linguistic units. Various known natural language processing programs can be used to discover variants in the text.

Continuing the previous example, linguistic units are extracted from the two received regulations by a text chunker. The linguistic units are "construction permit," "multiple family dwelling" and "licensed contractor." The following are the findings from the text chunker:
Canonical Linguistic Units:
Construction Permit (unit index): 1
Multiple Family Dwelling (unit index): 2
Licensed Contractor (unit index): 3
Variants
Construction Permits (variant index, unit): 1, 1
Multi-Family Dwelling (variant, unit): 2, 2
Licensed Contractors (variant, unit): 3, 3
Mentions: Construction Permit (Start, End, Unit, Variant)
Document Text 1: 2, 21, 1, 0

Document Text 2: 33, 52, 1, 0
Mentions: Multiple Family Dwellings (Start, End, Unit, Variant)
Document Text 1: 1, 25, 2, 2
Document Text 2: 1, 40, 2, 2
Mentions: Licensed Contractor (Start, End, Unit, Variant)
Document Text 1: 0, 0, 3, 0
Document Text 2: 10, 15, 3, 0
Document Text 2: 61, 72, 3, 0

The phrase "construction permit" is a linguistic unit that starts at position 2 and ends at position 21 in the first regulation, and starts at position 33 and ends at position 52 in the second regulation. The corresponding canonical unit #1 is "construction permit" and the variant (i.e., variations on "construction permit") is 0 since there are no variations in the regulations.

The second linguistic unit is the phrase "multiple family dwelling." In first regulation, "multiple family dwelling" starts at position 1 and ends at position 25, and in the second regulation, the "multi-family dwelling" starts at 1 and ends at 40. The corresponding canonical unit #2 is "multiple family dwelling" and there is one variant, "multi-family dwelling."

The third linguistic unit is the phrase "licensed contractor." In the first regulation, the start and ending positions as well as the canonical unit and variant are 0, since the linguistic unit is not present. In the second regulation, the third linguistic unit starts at 10 and ends at 15, and there is a second mention of this same phrase "licensed contractor" that starts at 61 and ends at 72.

In another embodiment, the visual-based document comparison program 110a, 110b may utilize other types of variant discovery. A lemmatizer can be used to lemmatize each mention into the lemma form used for the linguistic unit. For example, if the noun phrase is "multi-family dwellings," then the head noun is "dwellings" and the lemmatizer can return "dwelling" and thus "multi-family dwellings" becomes a variant of "multiple family dwellings" and the mention of the linguistic unit "multiple family dwelling" is "multi-family dwellings" in the document.

In another embodiment, the visual-based document comparison program 110a, 110b may utilize other types of text chunking, such as using phrases from a known phrase structure grammar constituent parser or named entities extracted by a known named entity recognizer. The linguistic units may be a single word or multiple words in a contiguous sequence (e.g., a phrase). When the linguistic unit is extracted, then the start and end positions may be stored.

In another embodiment, the visual-based document comparison program 110a, 110b may utilize other token processing methods, such as removal of certain words, stemming and disambiguation. A unit variation structure may be maintained for the canonical versions and the variants that are the mentions of the linguistic units in the received documents. For example, "reconcile" and "reconciling" from two different documents may be mapped to the same "reconcile." As such, the canonical unit may be "reconcile" and the variants may be "reconciles," "reconciling," and "reconciled." The visual-based document comparison program 110a, 110b may retain both the original appearance of the linguistic unit in the document (i.e., the "mention" of the linguistic unit) and the version utilized for indexing in a dictionary (the lemma form). In this way, the text in the document may map to a dictionary entry in the dictionary.

In another embodiment, the visual-based document comparison program 110a, 110b may utilize a known passage extractor to extract passages as subdocuments. Each passage may be given a number to index the passages within the larger document.

Then, at 206, latent semantic dimensions are built. The visual-based document comparison program 110a, 110b may compute a reduced dimensional vector space (i.e., low-rank matrix approximation) using latent semantics analysis (LSA), latent dirichlet allocation (LDA), or deep learning (i.e., neural networks). The computed low-rank matrix may have n dimensions (e.g., $D_1, D_2, \ldots D_n$). The visual-based document comparison program 110a, 110b starts by building a unit by document matrix, M. Each row may be a linguistic unit (e.g., $u_1, u_2, u_3, \ldots u_p$,) that may appear in one or more of the received documents and each column may be a document (e.g., $d_1, d_2, d_3 \ldots d_t$). Therefore, the matrix may be a p by t matrix, M, with p linguistic units in t documents. Since there may be thousands or millions of unique linguistic units in a large document store and many documents (thousands or millions), the matrix M may be very large. Each cell within the p by t matrix, M, has a value (e.g., 1 or 0) corresponding to a row (i.e., linguistic unit) and column (i.e., received document). If a "1" is present in the cell, then the given linguistic unit appears in the received document, and if a "0" is present in the cell, then the linguistic unit does not appear in the received document. Then, a known algorithm for computing the singular value decomposition of M may be utilized to reduce the high dimensional vector space (p×t) into a lower dimension space (n×n), using the singular value decomposition. For example, if p is 3 and t is 4 then M might be reduced to 2 by 2 lower rank matrix approximation. The number of desired dimensions of the lower rank matrix can be supplied as a Rank parameter. For very large document collections as many as 1000 dimensions (Rank=1000) may be used; however, 100 to 200 dimensions are typical.

Continuing the previous example, the following Table 1 is the unit by document matrix for the two received regulations on construction permits for multiple family dwellings in accordance to New York City building codes:

TABLE 1

|    | d1 | d2 |
|----|----|----|
| u1 | 1  | 1  |
| u2 | 1  | 1  |
| u3 | 0  | 1  |

The two received regulations are represented by d1 and d2, and the linguistic units are represented by u1 (i.e., construction permit), u2 (i.e., multiple family dwelling) and u3 (i.e., licensed contractor). Where a "1" is present for a linguistic unit and the corresponding document, the linguistic unit is present at least once in the document. Both "construction permit" and "multiple family dwelling" are present in both documents at least once each.

Then, at 208, the linguistic units are weighted using the dimensions. The visual-based document comparison program 110a, 110b may map each of the reduced dimensions to a weight of the linguistic units. The weight of each linguistic unit in each dimension may be determined from the factorization performed by the singular value decomposition (i.e., SVD). The factorization of a unit by document matrix M results in 3 matrices, U, S, and V.

$$M = U \times S \times V$$

The weight $W_i$ of a linguistic unit $U_i$ for dimension $D_k$ can be determined by multiplying the row vector for $U_i$ times $D_k$.

Continuing the previous example, the weight of each linguistic unit determined from the factorization performed by the singular value decomposition can be determined as follows:

First, given the Matrix M is as indicated in the following Table 2:

TABLE 2

|    | d1 | d2 |
|----|----|----|
| u1 | 1  | 1  |
| u2 | 1  | 1  |
| u3 | 0  | 1  |

The SVD of M is:
U
−0.657 −0.261
−0.657 −0.261
−0.369 0.929
S
2.136 0.000
0.000 0.662
V
−0.615 −0.788
−0.788 0.615

To compute the weight of linguistic unit "construction permit" for Dimension $D_1$, the row vector [−0.657, −0.261] is multiplied by the first column vector in S [2.136, 0.000] for an output of [−1.403, 0.000] that is multiplied by the first row vector in V [−0.615, −0.788] for an output of 0.863.

Therefore, the weights of each linguistic unit along dimension $D_1$ are "construction permit" weight is 0.863; "multiple family dwellings" is also 0.863; and "licensed contractor" is 0.000. Similarly, the weights of each linguistic unit along dimension $D_2$ can be computed using the matrices also "construction permit" and "multiple family dwellings" weights are 0.136 and the weight of "licensed contractor" is 0.378.

Then, at 210, the weighted linguistic units are mapped to a scaled visual feature. The visual-based document comparison program 110a, 110b may map the weighted linguistic units to a scale of a visual feature (e.g., shades of a color). Each dimension may be assigned a color hue. Although the visual-based document comparison program 110a, 110b may utilize up to a large quantity of colors (e.g., 12), the default amount of colors may be seven (e.g., red, orange, yellow, green, blue, purple and black) with black as the default color. Given a dimension, the text may be highlighted in various shades of color according to that dimension.

Additionally, the visual-based document comparison program 110a, 110b may group the linguistic units according to their weight t into p classes γ1 . . . γp in which the γ1 may include linguistic units with the smallest t, and γp with the largest t. The hue of a linguistic unit color for a weight with class γk (1≤k≤p) may include a range of hues, even though other hues may be utilized if applicable. The visual-based document comparison program 110a, 110b may consider the saturation and lightness of each color utilized to represent a dimension.

Continuing the previous example, the visual-based document comparison program 110a, 110b selects two hues, green and blue, one hue for each dimension. The shade of green for "construction permit" corresponds to the weight of the corresponding linguistic unit. Since "multiple family dwellings" has the same weight for the green dimension, "multiple family dwellings" is assigned a color with the same shade of green, and "licensed contractor" has been assigned the color blue with a certain shade. To gain visually distinctive colors, the shade (also called the lightness value) ranges from 50 and 20. To get the shade of the color green (hue of 120), there are 4 shades (between 20, 30, 40, and 50) so the shade is determined by multiplying the weight 0.863 by 30 to get 25.89 and rounding to the nearest decile, 30. The saturation level is set to 100. HSL stands for Hue Saturation Lightness and is one of the most common coordinate representations of points in an RBG (Red Green Blue) color model. Therefore, the color is HSL (120, 100, 30), and the total number of colors utilized by the program may be 11 times 4=44 plus 1 for black and thus 45.

In another embodiment, the user may modify the hues utilized by the visual-based document comparison program 110a, 110b based on a default, personal preferences or color-related conditions (e.g., color blind users may remove green if red is used as one of the hues). The rounding can also be changed or the number of hues can be changed to generate a larger visual comparison space of colors.

Then, at 212, the differences in latent semantics are determined. First, the difference between the received documents is determined by finding one document's primary dimension $D_1$ and the second document's most primary dimension $D_2$ that differentiates from $D_1$. The primary dimension contributing to a document may be determined using SVD by finding the largest value $k_a$ in the matrix S. The second document's differentiating dimension $D_2$ may be the largest value $k_b$ that is different from $k_a$ in S.

The difference weights of each of the linguistic units that appear in the first document that also appear in the second document are then computed. In particular, the weight of a linguistic unit along dimension D1 in the first document may be subtracted from the weight of the same linguistic unit (or variant) along dimension D1 in the second document. Thus, the linguistic unit u1 in document d1 may have a weight w1 for its primary dimension D1 and a weight w2 for the other dimension D2. Similarly, the same linguistic unit u1 or a variant in document d2 may have a weight w3 for differentiating dimension D2 and weight w4 for D1. The difference weight of linguistic unit u1 in d1 may be (w1-w4). The difference weight of linguistic unit u1 in document d2 may be (w3-w2). If the difference is negative, then the value of the difference weight may be set to 0. A mention of a linguistic unit that only appears in d1 or d2, for example, will have a difference weight only according to the primary dimension and not be adjusted. Mentions of linguistic units that are below a threshold (e.g., 0.1) may be set to 0.

Continuing the previous example, there are two dimensions (e.g., D1 and D2), where there is a difference between the two documents. To compute the difference between D1 and D2, the algorithm computes a difference in value for each linguistic unit in the document. The mentions may be the occurrences of the linguistic unit in the document, and the various weights may be for the linguistic unit. However, the weights may be utilized for each mention of the linguistic unit in the document for the visualization. The following are the differences determined for each linguistic unit in the two documents:

Document 1:
"construction permit" (0.863-0.136) is 0.727
"multiple family dwellings" (0.863-0.136) is 0.727
"licensed contractor" (0-0.378) is 0.000
Document 2:
"construction permit" (0.136-0.863) is 0.000
"multiple family dwellings" (0.136-0.863) is 0.000
"licensed contractor" (0.378-0) is 0.378

In another embodiment, the visual-based document comparison program 110a, 110b may include passages that cover the received document (i.e., paragraphs in regulations). As such, the visual-based document comparison program 110a, 110b may be utilized to find the passage with the greatest difference or least difference with a selected passage in the received document. Similarly, two passages with the greatest difference or least difference from two different documents can be compared.

In another embodiment, if the visual-based document comparison program 110a, 110b determines that there is no difference between the passages, then the visual-based document comparison program 110a, 110b may print or display, "No difference" on the screen to inform the user of the result of the comparison. In this case, both documents will appear black (with a white background).

Then, at 214, the documents are visualized. The output of the visual-based document comparison program 110a, 110b may include a set of documents in which each document is marked up with the weighted visual features that highlight the differences between the documents (e.g., the original documents with font color mark-ups on the mentions of the linguistic units). If differences were determined in step 212, then the different weights are used, otherwise the weight of each linguistic unit along the primary dimension is used for the first document and the weight of each linguistic unit along the differentiating dimension is used for the second document. The user may be presented with the set of documents rendered for comparisons (e.g., the marked up/highlighted documents in a web browser with a split view, either horizontally or vertically or some other arrangement). The visual-based document comparison program 110a, 110b may add mark-ups to the text. A hue, saturation and lightness value may be translated into a hexadecimal code using known standard mappings, and HTML tags may be added.

The similarities or differences of each document may be utilized to visualize the similarities or differences of each document. The menu may include two settings: similarities and differences. If the similarities setting is set, then the mentions of linguistic units in both documents may be colored according to the highest dimension of the first passage. The user may select the second highest dimension, third highest, and so forth. If the differences setting is set, then the two documents may be displayed, and the mentions of the linguistic units are colored according to the differences.

Additionally, the user may determine a threshold for the similarities between the documents in which the passages within the documents may be considered similar if the passages satisfy the threshold value. For example, at the bottom of the screen, there may be a "Threshold" button, when the user clicks on that "Threshold" button, the user may be prompted (via dialog box) to input a threshold value from 0-1, or another range of normalized numbers. Any number entered in the dialog box may be the threshold value in which a weight equal to or greater than that entered threshold value may be considered a similarity between the compared documents. Mentions of linguistic units below the threshold may have a font color of black.

Continuing the previous example, the user indicated that the user prefers to view the differences between the two regulations. As such, the visual-based document comparison program 110a, 110b presents the two regulations with the difference weighted visual features on a screen. The two highlighted regulations are viewed side-by-side on the screen at the same time for the user to compare the two regulations and determine the changes in construction for multiple family dwellings according to the New York City building codes. The comparison determines that the definition of multiple family dwellings changed in the updated regulation to exclude two family dwellings, and any construction projects involving the multiple family dwellings should be performed by a licensed contractor with sufficient construction permits submitted to the Department of Buildings and any board or administrative group associated with the multiple family dwelling.

Differences would be visualized:
Document 1:
A construction permit for a multi family dwelling.
Document 2:
A licensed contractor (in blue) was given a construction permit for multiple family dwellings. It was a new licensed contractor (in blue).

Since the weights for "construction permit" and "multiple-family dwelling" linguistic units are the same in the documents, when they are subtracted their difference weights are 0, the linguistic units of "construction permit" and "multiple-family dwelling" are colored black. The color black for these linguistic units are identified by italicizing the relevant text. The linguistic unit "licensed contractor" is colored twice in the second document because there are two mentions in the second document. The hue 200 (blue) was chosen as the color for the second dimension. The color blue for the linguistic unit "licensed contractor" is identified by underlining the relevant text. The first dimension hue, green, is not seen since the linguistic unit mentions are colored black.

Using this visualization of the differences, the difference of the licensed contractor is highlighted, and it is therefore easy to observe the superficial differences in linguistic variants, and phrases that are semantically similar between the documents are not highlighted. If the first document also contained a mention of linguistic unit "building application" that had a weight for dimension D1 then it would be highlighted in a shade of green (since green was chosen as the hue of the first dimension). The differences would appear like this:
Document 1:
A building application (in green) for a multi family dwelling.
Document 2:
A licensed contractor (in blue) was given a construction permit for multiple family dwellings. It was a new licensed contractor (in blue).

The visual-based document comparison program 110a, 110b deemphasizes that both documents are about multiple (or multi-) family dwellings, highlights the aspect of the building application for the first document and the licensed contractor for the second document. If the user is interested in the building application aspect, the user can look at similarities and observe that the first document is about a building application and the second is similarly about a construction permit. Latent semantic similarities and differences are found quickly across the two documents. More subtle differences can then be explored by reading sentences with highlighted words or phrases.

In another embodiment, the visual-based document comparison program 110a, 110b may include a "Dimensions" menu for browsing through the dimensions of similar or different documents. According to the hue of the dimension, each menu entry is colored. A maximum number words (e.g., five) may be selected that are the sorted highest weighted linguistic units for the dimension and then rendered as the text on the menu entry. These linguistic units may change when the latent semantic dimensions are recomputed. For example, one menu entry may be "construction permit, multiple family dwellings" and another menu entry may be "licensed contractor, construction permit."

In another embodiment, the generated document with mark-up may be saved for fast viewing and browsing, and locked for updates while the latent semantic space may be computed. The mark-up document may be edited, versioned, or other operations may be performed with a docket management system. The data retained in a data file may include the document text, linguistic unit mentions and generated mark-up. The data file may also include a link to the document collection and the generated unit variation structure.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
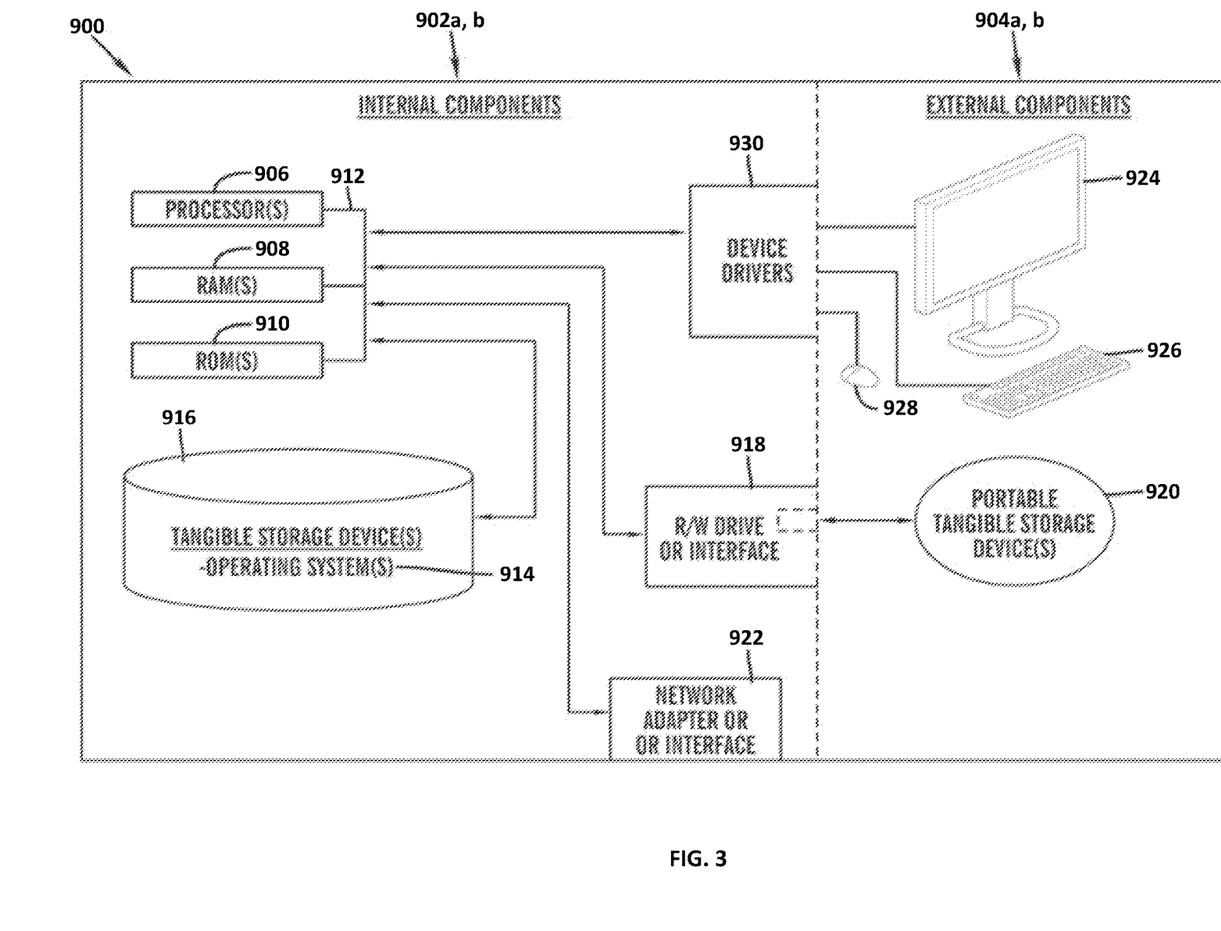
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the visual-based document comparison program 110a in client computer 102, and the visual-based document comparison program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visual-based document comparison program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the visual-based document comparison program 110a in client computer 102 and the visual-based document comparison program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visual-based document comparison program 110a in client computer 102 and the visual-based document comparison program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
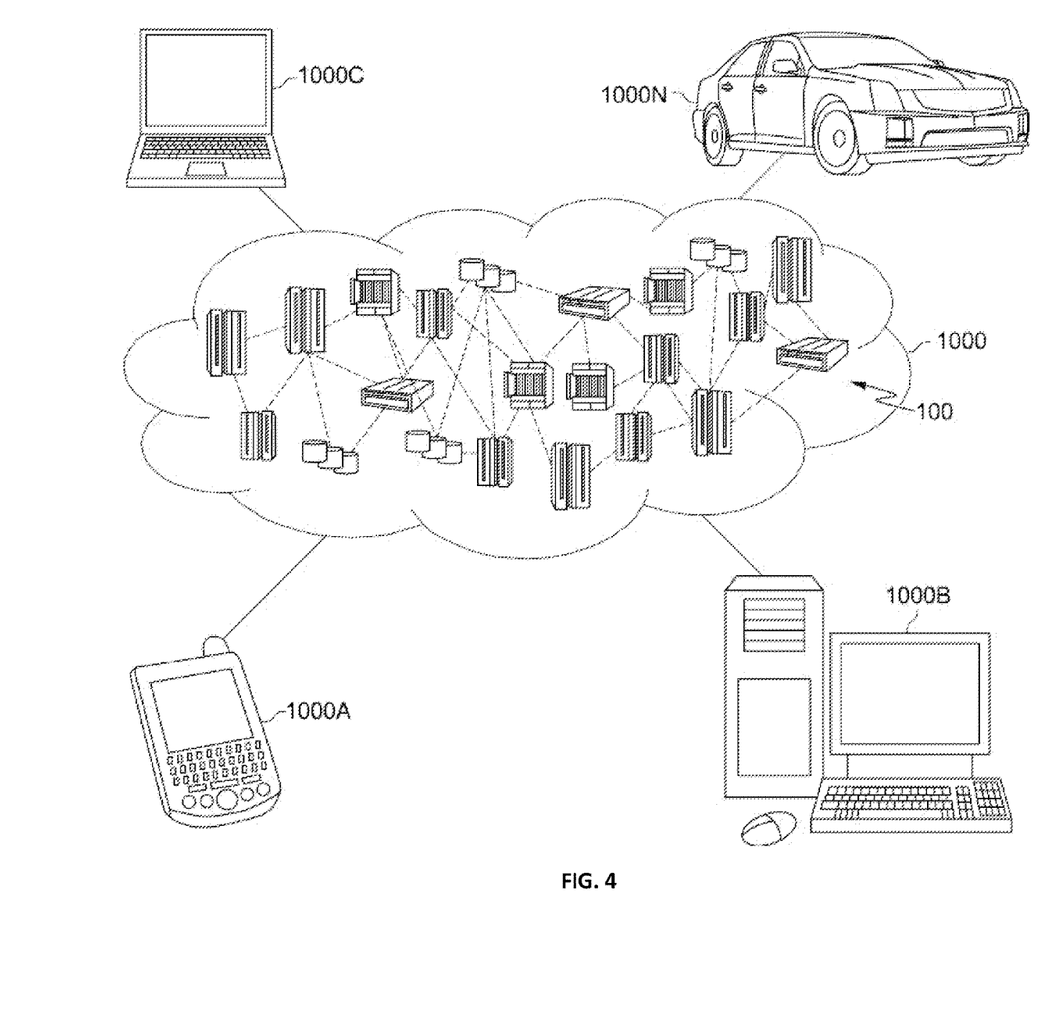
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
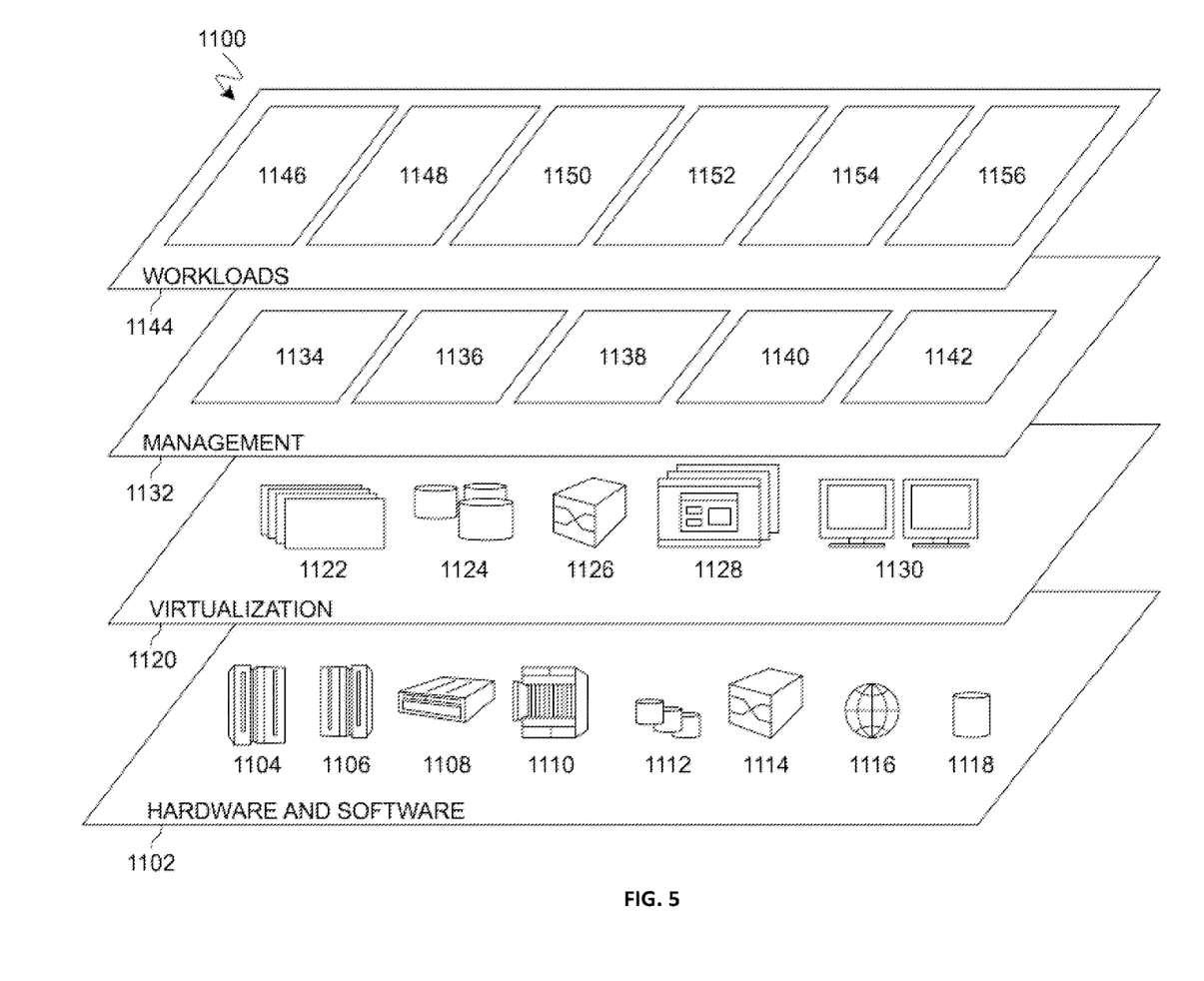
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and visual-based document comparison 1156. A visual-based document comparison program 110a, 110b provides a way to compare documents using latent semantic differences.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for comparing documents using latent semantic differences, the method comprising:
   receiving a plurality of documents from a user;
   extracting a plurality of linguistic units associated with the received plurality of documents,
      wherein a canonical unit for each linguistic unit from the extracted plurality of linguistic units is determined,
      wherein that at least one variation of each linguistic unit from the extracted plurality of linguistic units are present is determined,
      wherein a number of variations of each linguistic unit from the extracted plurality of linguistic units by utilizing a dictionary is determined,
         wherein the determined number of variations of each linguistic unit is tracked by utilizing a set of tables,
      wherein at least one start position and at least one end position with each linguistic unit from the extracted plurality of linguistic units is stored,
         wherein each linguistic unit from the extracted plurality of linguistic units includes a plurality of words in a contiguous sequence;
   building a plurality of latent semantic dimensions based on the extracted plurality of linguistic units;
   weighting the extracted plurality of linguistic units utilizing the built plurality of latent semantic dimensions;
   determining a plurality of latent semantic differences between the received plurality of documents based on weighted plurality of linguistic units;
   mapping the weighted plurality of linguistic units to a scaled visual feature; and
   generating a visualization to the user of the received plurality of documents based on the determined plurality of latent semantic differences and the scaled visual feature,
      wherein a plurality of mark-ups is added to the mapped plurality of linguistic units,
      wherein at least one value associated with at least one dimension of the mapped plurality of linguistic units from each of the received plurality of documents is correlated with at least one value associated with a hue, a saturation and a lightness based on the determined plurality of latent semantic differences associated with the at least one dimension of the mapped plurality of linguistic units,
      wherein the at least one value associated with the hue, saturation and lightness is translated into a hexadecimal code.

2. The method of claim 1, wherein building the plurality of latent semantic dimensions based on the extracted plurality of linguistic units, further comprises:
   generating a plurality of reduced dimensions to a percentage weight associated with the extracted plurality of linguistic units using deep learning, wherein the deep learning comprises a combination of weights of the extracted plurality of linguistic units associated with the received plurality of documents.

3. The method of claim 1, wherein generating the visualization to the user of the received plurality of documents based on the presented plurality of latent semantic differences and the scaled visual feature, further comprises:
   subtracting at least one latent semantic dimension from one of the built plurality of latent semantic dimensions associated with another one of the received plurality of documents; and
   generating a visual representation of the mapped plurality of latent semantic differences associated with the received plurality of documents.

4. The method of claim 3, further comprising:
   determining the user selected to visualize a plurality of latent semantic similarities between the received plurality of documents;
   receiving, from the user, a threshold value to define the determined plurality of latent semantic similarities between the received plurality of documents;
   comparing the determined threshold value with each of the determined plurality of latent semantic similarities; and
   generating a visual representation of the mapped plurality of latent semantic similarities associated with the received plurality of documents.

5. The method of claim 1, wherein receiving the plurality of documents from the user, further comprises:
   uploading the plurality of documents onto a cloud storage by the user; and
   selecting, by the user, the plurality of documents from the cloud storage for comparison.

6. The method of claim 1, wherein mapping the weighted plurality of linguistic units to the scaled visual feature, further comprises:
   assigning a hue to each of the latent semantic dimensions of the built plurality of latent semantic dimensions; and
   determining a range of lightness and saturation for each assigned hue associated with each latent semantic dimension of the built plurality of latent semantic dimensions.

7. A computer system for comparing documents using latent semantic differences, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a plurality of documents from a user;
   extracting a plurality of linguistic units associated with the received plurality of documents, wherein a canonical unit for each linguistic unit from the extracted plurality of linguistic units is determined,
wherein that at least one variation of each linguistic unit from the extracted plurality of linguistic units are present is determined,
wherein a number of variations of each linguistic unit from the extracted plurality of linguistic units by utilizing a dictionary is determined,
wherein the determined number of variations of each linguistic unit is tracked by utilizing a set of tables,
wherein at least one start position and at least one end position with each linguistic unit from the extracted plurality of linguistic units is stored,
wherein each linguistic unit from the extracted plurality of linguistic units includes a plurality of words in a contiguous sequence;
building a plurality of latent semantic dimensions based on the extracted plurality of linguistic units;
weighting the extracted plurality of linguistic units utilizing the built plurality of latent semantic dimensions;
determining a plurality of latent semantic differences between the received plurality of documents based on weighted plurality of linguistic units;
mapping the weighted plurality of linguistic units to a scaled visual feature; and
generating a visualization to the user of the received plurality of documents based on the determined plurality of latent semantic differences and the scaled visual feature,
wherein a plurality of mark-ups is added to the mapped plurality of linguistic units,
wherein at least one value associated with at least one dimension of the mapped plurality of linguistic units from each of the received plurality of documents is correlated with at least one value associated with a hue, a saturation and a lightness based on the determined plurality of latent semantic differences associated with the at least one dimension of the mapped plurality of linguistic units,
wherein the at least one value associated with the hue, saturation and lightness is translated into a hexadecimal code.

8. The computer system of claim 7, wherein building the plurality of latent semantic dimensions based on the extracted plurality of linguistic units, further comprises:
generating a plurality of reduced dimensions to a percentage weight associated with the extracted plurality of linguistic units using deep learning, wherein the deep learning comprises a combination of weights of the extracted plurality of linguistic units associated with the received plurality of documents.

9. The computer system of claim 7, wherein generating the visualization to the user of the received plurality of documents based on the presented plurality of latent semantic differences and the scaled visual feature, further comprises:
subtracting at least one latent semantic dimension from one of the built plurality of latent semantic dimensions associated with another one of the received plurality of documents; and
generating a visual representation of the mapped plurality of latent semantic differences associated with the received plurality of documents.

10. The computer system of claim 9, further comprising:
determining the user selected to visualize a plurality of latent semantic similarities between the received plurality of documents;
receiving, from the user, a threshold value to define the determined plurality of latent semantic similarities between the received plurality of documents;
comparing the determined threshold value with each of the determined plurality of latent semantic similarities; and
generating a visual representation of the mapped plurality of latent semantic similarities associated with the received plurality of documents.

11. The computer system of claim 7, wherein receiving the plurality of documents from the user, further comprises:
uploading the plurality of documents onto a cloud storage by the user; and
selecting, by the user, the plurality of documents from the cloud storage for comparison.

12. The computer system of claim 7, wherein mapping the weighted plurality of linguistic units to the scaled visual feature, further comprises:
assigning a hue to each of the latent semantic dimensions of the built plurality of latent semantic dimensions; and
determining a range of lightness and saturation for each assigned hue associated with each latent semantic dimension of the built plurality of latent semantic dimensions.

13. A computer program product for comparing documents using latent semantic differences, comprising:
one or more computer-readable storage media and program instructions stored on at least one of the one or more non-transitory storage media, the program instructions executable by a processor to cause the processor to perform a method comprising:
receiving a plurality of documents from a user;
extracting a plurality of linguistic units associated with the received plurality of documents,
wherein a canonical unit for each linguistic unit from the extracted plurality of linguistic units is determined,
wherein that at least one variation of each linguistic unit from the extracted plurality of linguistic units are present is determined,
wherein a number of variations of each linguistic unit from the extracted plurality of linguistic units by utilizing a dictionary is determined,
wherein the determined number of variations of each linguistic unit is tracked by utilizing a set of tables,
wherein at least one start position and at least one end position with each linguistic unit from the extracted plurality of linguistic units is stored,
wherein each linguistic unit from the extracted plurality of linguistic units includes a plurality of words in a contiguous sequence;
building a plurality of latent semantic dimensions based on the extracted plurality of linguistic units;
weighting the extracted plurality of linguistic units utilizing the built plurality of latent semantic dimensions;
determining a plurality of latent semantic differences between the received plurality of documents based on weighted plurality of linguistic units;
mapping the weighted plurality of linguistic units to a scaled visual feature; and generating a visualization to the user of the received plurality of documents based on the determined plurality of latent semantic differences and the scaled visual feature,
   wherein a plurality of mark-ups is added to the mapped plurality of linguistic units,
   wherein at least one value associated with at least one dimension of the mapped plurality of linguistic units from each of the received plurality of documents is correlated with at least one value associated with a hue, a saturation and a lightness based on the determined plurality of latent semantic differences associated with the at least one dimension of the mapped plurality of linguistic units,
   wherein the at least one value associated with the hue, saturation and lightness is translated into a hexadecimal code.

14. The computer program product of claim 13, wherein building the plurality of latent semantic dimensions based on the extracted plurality of linguistic units, further comprises:
   generating a plurality of reduced dimensions to a percentage weight associated with the extracted plurality of linguistic units using deep learning, wherein the deep learning comprises a combination of weights of the extracted plurality of linguistic units associated with the received plurality of documents.

15. The computer program product of claim 13, wherein generating the visualization to the user of the received plurality of documents based on the presented plurality of latent semantic differences and the scaled visual feature, further comprises:
   subtracting at least one latent semantic dimension from one of the built plurality of latent semantic dimensions associated with another one of the received plurality of documents; and
   generating a visual representation of the mapped plurality of latent semantic differences associated with the received plurality of documents.

16. The computer program product of claim 13, wherein receiving the plurality of documents from the user, further comprises:
   uploading the plurality of documents onto a cloud storage by the user; and
   selecting, by the user, the plurality of documents from the cloud storage for comparison.

17. The computer program product of claim 13, wherein mapping the weighted plurality of linguistic units to the scaled visual feature, further comprises:
   assigning a hue to each of the latent semantic dimensions of the built plurality of latent semantic dimensions; and
   determining a range of lightness and saturation for each assigned hue associated with each latent semantic dimension of the built plurality of latent semantic dimensions.

* * * * *